Figure 1:
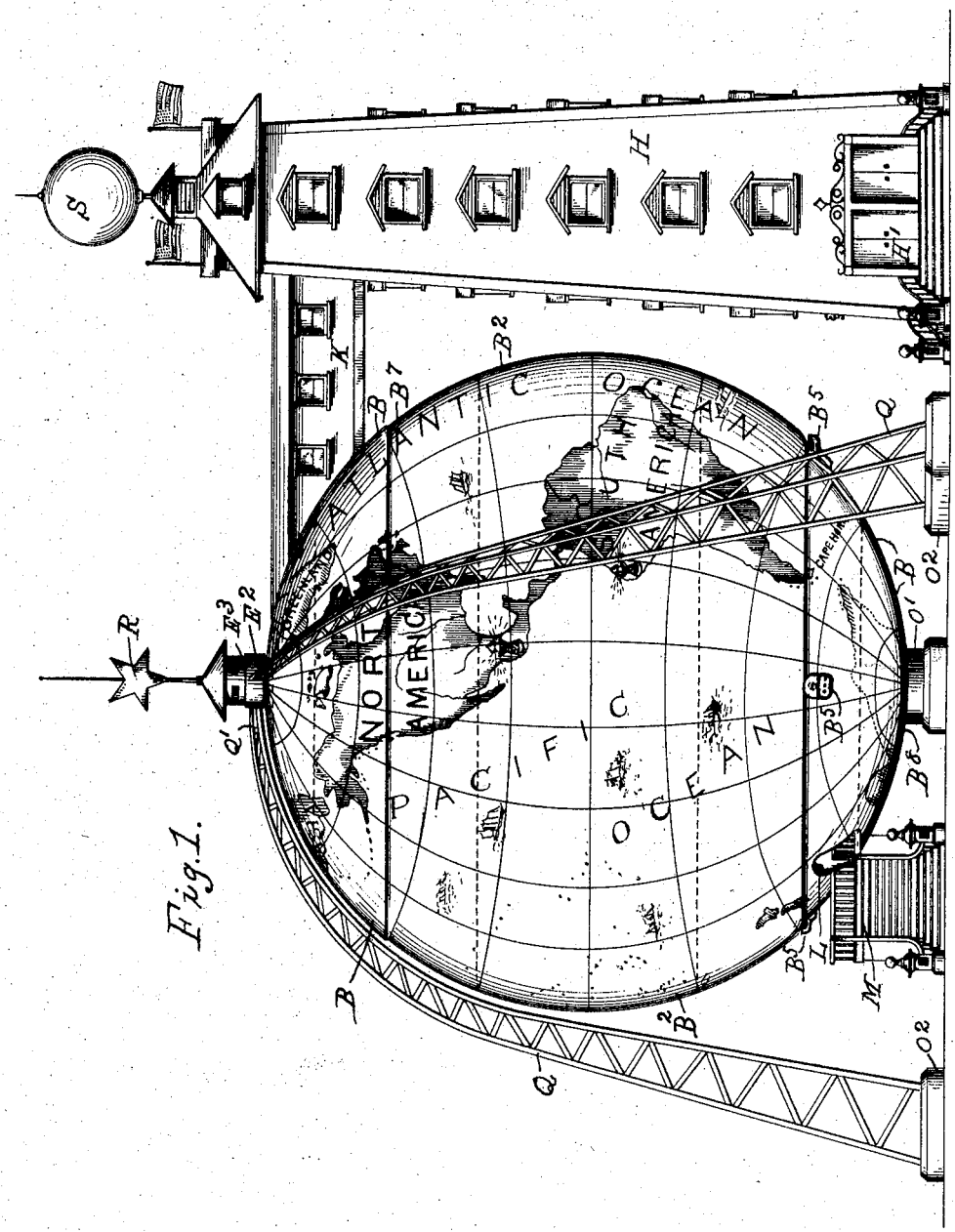

No. 772,570. PATENTED OCT. 18, 1904.
L. H. MARTIN.
MOVING SPIRAL CYCLORAMA.
APPLICATION FILED JAN. 5, 1904.
NO MODEL. 3 SHEETS—SHEET 1.

Witnesses
Edward Rowland
M. Rosenblatt

Inventor
Louie H Martin
By his Attorney
Thomas F. Gaynor

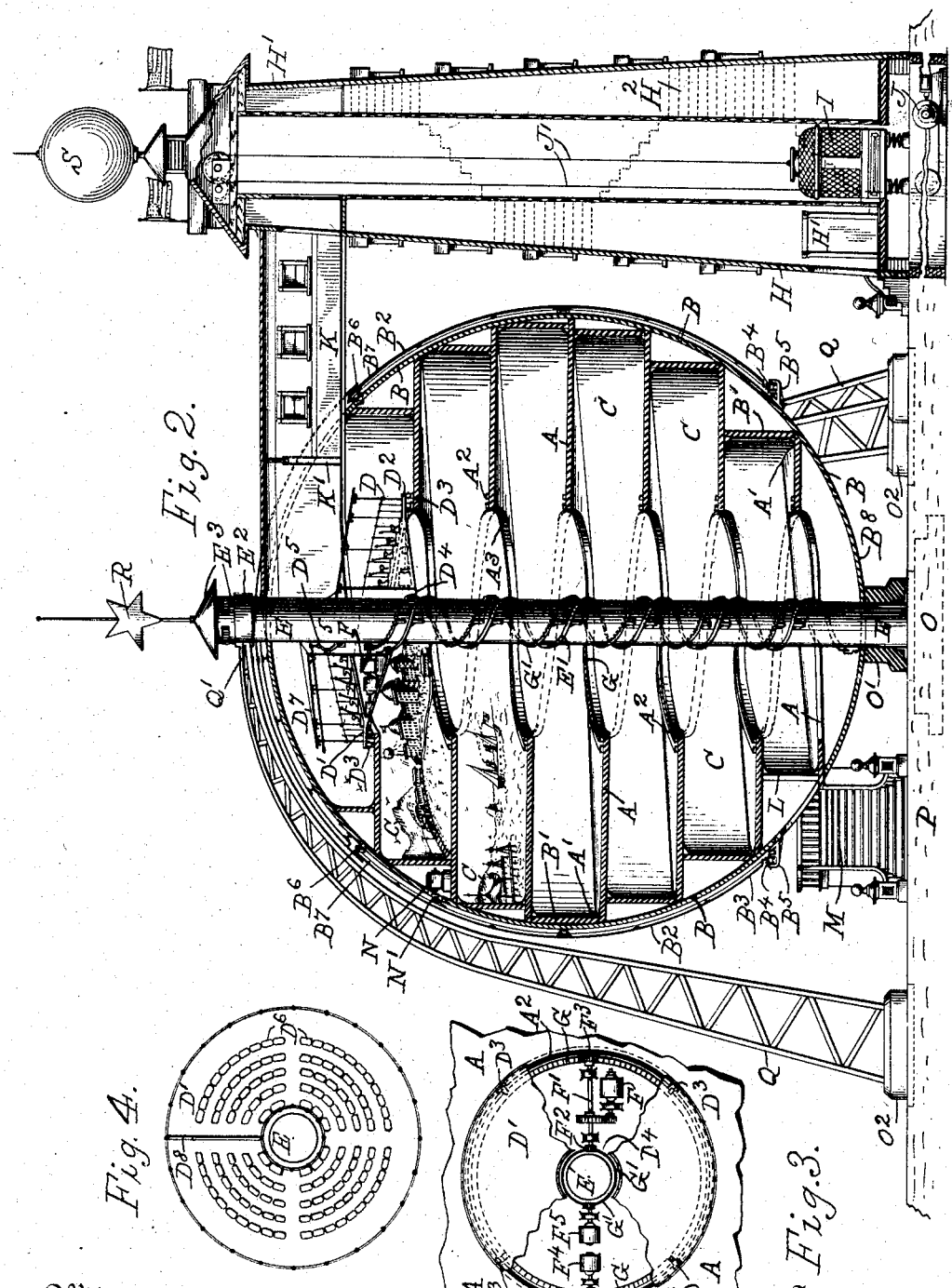

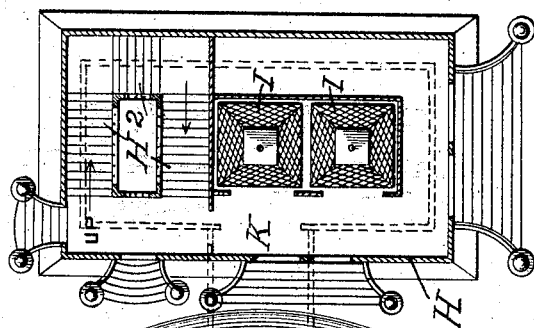
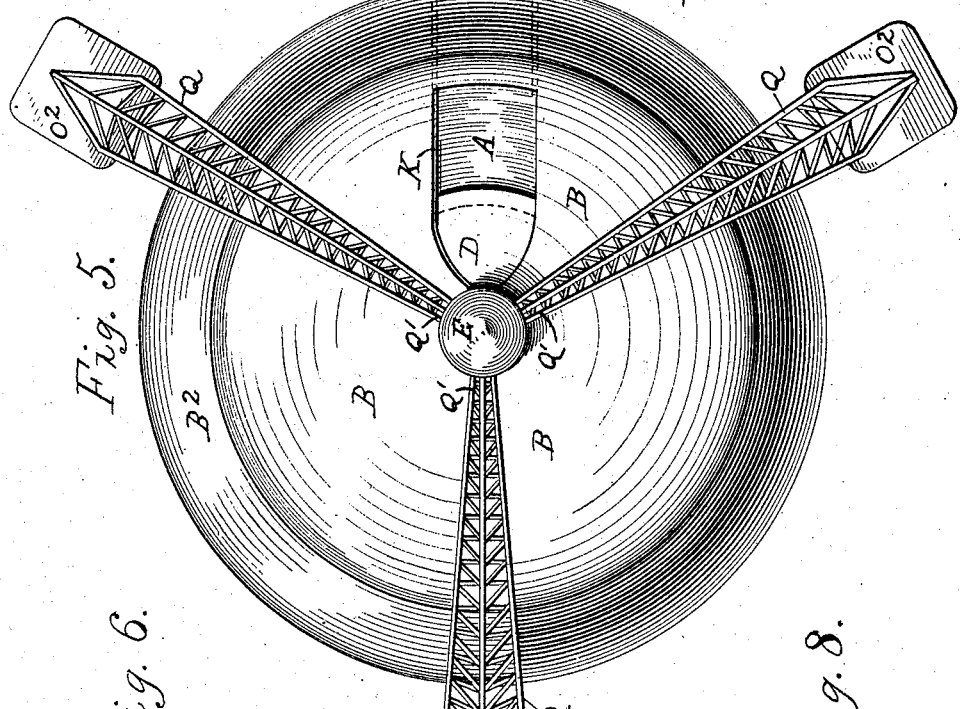
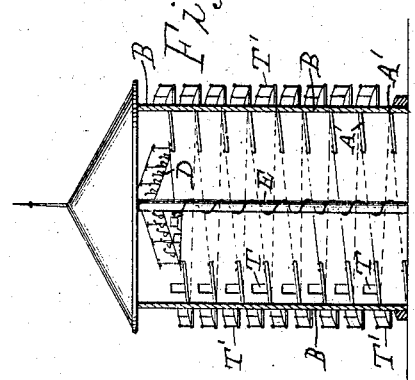
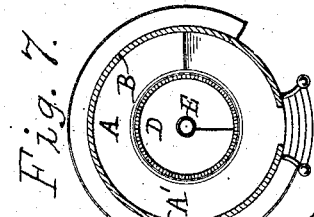

No. 772,570.	Patented October 18, 1904.

UNITED STATES PATENT OFFICE.

LOUIE H. MARTIN, OF NEW YORK, N. Y., ASSIGNOR TO GLOBE AMUSEMENT COMPANY, A CORPORATION OF NEW YORK.

MOVING SPIRAL CYCLORAMA.

SPECIFICATION forming part of Letters Patent No. 772,570, dated October 18, 1904.

Application filed January 5, 1904. Serial No. 187,791. (No model.)

*To all whom it may concern:*

Be it known that I, LOUIE H. MARTIN, a citizen of France, and a resident of New York, in the county of New York and State of New York, have invented certain new and useful Improvements in Moving Spiral Cycloramas, of which the following is a specification.

This invention relates to moving spiral cycloramas.
It consists in providing within a closed structure a spiral flooring constructed around a vertical axis, and upon which flooring and its contiguous side walls and ceilings cycloramic and panoramic objects and scenes are placed and painted with proper stage settings and mountings and with visual and audible accessories to make the scenery as realistic as possible to a spectator.

The invention also consists in providing a car which by suitable motor mechanism is revolved around the axis of the structure, the platform of which is spiral, coinciding with the pitch of the floor and being supported by wheels running on a track upon the floor and the platform having seats from which the spectators may view the passing scenery as the car revolves about and moves up and down the axis.

The invention further consists in making the structure in the form of a hollow globe, the exterior surface of which is decorated to represent the surface of the earth, and in constructing the outer shell portion so that it may have a rotary motion around the axis through proper motor apparatus provided therefor, so as to simulate the axial rotation of the earth.

The invention also consists in providing suitable supports to securely hold the structure in proper position and in providing means of entrance and exit to and from its interior, and in such other novel construction as will be hereinafter more fully described, and specially pointed out in the claims.

The object of this invention is to provide an instructive scenic apparatus that shall be educational and entertaining and illustrating the geographical appearance and axial motion of the earth and suggesting observations, impressions, and experiences similar to those of a person making a trip around the world or the like.

The nature and object of the invention will be more fully explained in the following specification, taken in connection with the accompanying drawings, forming a part thereof, and in which similar letters refer to similar parts throughout the several views.

In the drawings, Figure 1 represents a front elevation of my invention, shown in the form of a large hollow sphere representing the earth, with its south pole resting upon an axial foundation and its north pole as held in a vertical position by means of three braces connected thereto like a tripod, the lower extremities of which rest upon and are secured to suitable foundations in the ground to give the edifice proper stability. This figure also shows the double means of entrance and exit provided for access to and from the interior of the globe, the lower opening communicating with a flight of stairs to the ground and the upper opening connecting by a short bridge with an elevator-tower equipped with a suitable passenger-elevator mechanism and stairs also leading to the ground. It also shows the relative revoluble and stationary portions of the outer shell of the structure and its decorated exterior earth-like appearance. Fig. 2 is a vertical sectional view of Fig. 1, showing the interior construction and appearance of the whole structure, including its axis, the spiral floor, some of the views and objects therein, the spectators'-car mechanism, and the revoluble portion of the shell and its motor mechanism. It also shows the interior arrangements for entrance and exit and of the elevator mechanism and stairs in connection therewith. Fig. 3 is a sectional plan view of the car with its platform partly removed to show the arrangement of its motor mechanism and the track upon which the car runs and its relation with the axis of the structure and the spiral floor therein, which is also shown in part. Fig. 4 is a top view of the car and the arrangement of the spectators' seats thereon. Fig. 5 is a top or plan view of Figs. 1 and 2, showing the connection of the braces with the top of the structure and the upper opening in the latter and the plan of the bridge leading therefrom to the elevator-shaft and elevators connecting therewith. Fig. 6 represents a vertical sectional view of the outer shell of the structure, made with vertical walls and emergency means of exit, as a modified form of construction of the invention. Fig. 7 is a horizontal or plan view of the form of structure shown in Fig. 6, with the walls constructed as of cylindrical shape; and Fig. 8 is a similar view, only showing the outer walls of the structure as of octagonal form of construction.

In the drawings, A A A represent sections of a spiral floor, supported by the outer side walls B B B of the inclosing structure or building, which may be of any suitable construction that will give proper support and stability to the edifice and which are shown in Figs. 1, 2, and 5 as being in the form of a sphere and in Figs. 6, 7, and 8 as vertical. The outer edges $A'$ $A'$ of the floor A join with the side wall B in a manner similar to that in any ordinary building having floors therein when the structure is as in the form shown in Figs. 6, 7, and 8; but when it is made in the spherical shape the latter necessitates inner walls $B'$ $B'$, as seen in Fig. 2, that their interior surfaces may be vertical for the scenes C C to be painted or mounted thereon in the most effective position for observation. The floor A can have placed in suitable positions thereon objects representing buildings, trains in motion, ships, docks, and all other cycloramic imitations and effects that may be desired and as illustrated in Fig. 2.

The car D consists of a circular platform $D'$, which revolves around the vertical tubular axis E of the structure and the outer edge $D^2$ of which is mounted upon wheels $D^3$ $D^3$, which run upon a track $A^2$ upon the inner edge $A^3$ of the floor A and which edge terminates at a short distance inside of the track $A^2$. A similar wheel-and-track arrangement is provided for the car-platform at its inner edge $D^4$, the track $E'$ being secured in position around the axial tube E. In this way the car-platform $D'$ has its outer and inner edges supported by wheels running upon the corresponding tracks $A^2$ $E'$, thereby insuring a smooth-running bearing for the car while in motion, and the wheels running thereon being grooved to give the car proper guidance in its axial rotation around the central tube E. Motion is communicated to the car D by the electric motor F and shaft $F'$, having the gears $F^2$ $F^3$ on its inner and outer ends, respectively, and which engage with the rack G upon the floor A inside of the track $A^2$ and the corresponding rack $G'$, secured to the tube E above the corresponding track $E'$ thereon, respectively, and as seen in Fig. 3. The gears $F^2$ and $F^3$ have their respective pitch diameters of proper proportional dimensions to suit the corresponding diameters of the racks G $G'$ and so that the power will be applied uniformly at both edges of the platform $D'$ of the car D.

$F^4$ $F^5$ represent independent motors to apply the power to the gears engaging with the racks G $G'$ as an alternative method of applying the power in moving the car, and the intermediate gearing necessary in transmitting the power from the motors being omitted for purposes of clearness of illustration.

The car D is provided with a brake $D^5$ and seats $D^6$ $D^6$ for the spectators and over which a canopy $D^7$ may be arranged, if desired, so as to limit the field of vision to the floor and wall upon which the scenery is arranged. The platform $D'$ of the car D is constructed with a pitch corresponding to the pitch of the floor A and so as to coincide therewith as the car revolves around the axis E and up and down thereon in making a trip from the top to the bottom of the structure, and vice versa, and while the spectators are observing the scenery in passing the latter. By this construction it can be seen that the car-platform $D'$ has a pitch of one complete spiral, the upper and lower radial edges of which are directly over each other, as seen at $D^8$ in Fig. 4, and the floor $D^5$ having the corresponding pitch resulting from such construction. By this arrangement the car-platform $D'$ will always slope upwardly from the floor A no matter what position the car may be in during its rotation around the tube E, while making its trip up and down with the spectators and giving the latter an unobstructed view of the scenery.

In Fig. 2 the car D is shown in position near the top of the globe ready to make a trip down to the bottom of the structure. The spectators can reach the car in this position by entering the tower H through the door $H'$, taking one of the elevators I I, which by means of the motor mechanism J and cable $J'$ conveys them to the bridge K, connecting near the top $H'$ of the tower H, and which bridge leads through the opening $K'$ in the globe to the car D. The tower H is provided with a stairway $H^2$, that can be used by the spectators at any time in an emergency and independent of the elevators I I. When the car D completes its trip downwardly, the spectators can use the opening L near the bottom of the structure as a means of exit and thence by the flight of stairs M reach the ground. The course of entering and leaving the structure thus described can be reversed, as can be understood, thereby giving the spectators the trip up to the top in a reverse order and so that when the trip is completed they can leave by way of the bridge K and the elevators I I, and thereby reach the ground in that direction. This arrangement gives the use of the car D in both directions, thereby saving any loss of time that might occur if the car carried its passengers in one direction only while viewing the scenery.

When the structure is made in the form of a globe representing the earth and a rotary motion is to be given to a portion of its exterior surface, this result is effected by making that portion B² of its outer shell between the bridge K and the opening L independent of the main wall B and slightly larger than the latter, with its lower edge B³ resting upon grooved rollers B⁴ B⁴, mounted upon brackets B⁵ B⁵, secured to the main wall B. A similar roller-and-bracket arrangement B⁶ is provided near its upper edge B⁷. By this arrangement the upper and lower edges B⁷ B³ of the outer shell B² are guided concentrically in horizontal planes around the axis E and in a horizontal direction as motion is given to it by means of the electric motor device N through a gear-and-rack arrangement N', somewhat similar to that shown in Fig. 3 for moving the car D. Controlling devices to control the supply of electricity required to operate the motor mechanisms shown may be arranged at any suitable locations within or near the structure and through which the whole apparatus can be actuated as desired. When made in the form of a globe, the axial tube E rests upon a foundation O in the ground P and as indicated by dotted lines in Fig. 2, while the base B⁸ of the wall B may be supported by the column O'. The braces Q Q Q rest upon foundations O² O² O², and their upper extremities Q' Q' Q' are secured to a band E² around the upper end E³ of the axial tube E, thereby giving stability of position to the latter and the whole structure. When the walls of the structure are vertical, as seen in Fig. 6, their construction is like that of any building and as can be understood without further description.

A hollow star-shaped figure R is secured to the top of the axial tube E to represent the north star and which may be illuminated at night to be visible. A hollow sphere S, representing the moon, also surmounts the elevator-tower H and which can likewise be illuminated at night, so as to be readily seen. The contour of the continents and countries on the surface of the globe can be shown by electric lights at night and the whole apparatus otherwise so illuminated as to be operated, viewed, and patronized by night as well as in the day-time.

The whole structure can be made of any convenient size and of any suitable material, but is preferably made of iron, steel, brick, or stone, exclusively, to be fireproof and with proper means of exit T T' for emergencies, as already referred to.

The views, pictures, scenic objects, and effects can be varied indefinitely, and thus give an endless change of entertainment and instruction to the spectators and patrons of the structure, and the motion of the car can be made to imitate the motion of cars, ships, or the like by suitable modifications of the platform and track constructions. The element of movement of the car gives the spectators sensations similar to those of a passenger on a railroad-car in motion in viewing the apparently-moving landscape from a window or the like. This is one of the advantages of this apparatus compared with ordinary cycloramas, where all is stationary to the spectator and everything is viewed from one plane or point. A guide or lecturer is supposed to travel with the car during its trip and to explain the subjects of interest in the scenery to the spectators.

From the foregoing description the operation of the whole apparatus can be easily understood. The spectators are admitted to the interior of the structure through either of the entrances, as already described, and where the car will be in readiness to convey them thereon spirally up or down, as the case may be, and bringing all the scenery and effects in successive views before them as they ride along and pass it by on the several convolutions of the floor and the walls where it appears until the end of the trip is reached, when they can then leave the place by the means provided and as already explained.

In Fig. 1 the western hemisphere is presented to view and the continent and lines of latitude being shown as they are projected on a map; but it is to be understood that in practice the surface of the sphere is to be painted and lined like any common globe representing the earth—that is, with the lines of latitude parallel with the equator, as indicated by the dotted lines in the figure instead of as by the full lines thereon, and the geographical appearance of the sphere otherwise correspondingly and properly arranged. It can also be understood that the entrance and exit openings can be made through the axial tube instead of being as shown in the figures by accordingly modifying the construction of the structure and so as to give a rotary motion to the entire visible outer surface of the sphere and that such a modification would be within the scope of this invention.

It can thus be seen that I provide a novel apparatus of an educational and entertaining character that is complete in construction and operation and in every way adapted to meet the requirements of such a structure and which can be understood without further illustration or description.

Having thus described my invention, what I claim, and desire to secure by Letters Patent, is—

1. A cyclorama consisting of a floor constructed around a vertical axis in the form of a spiral with a wall around its outer edge, and upon which panoramic and cycloramic scenes and objects may be arranged, substantially as specified.

2. A cyclorama consisting of a floor constructed in the form of a vertical spiral with a wall around its outer edge, and upon which panoramic and cycloramic scenes and objects may be arranged, and a spectators' car adapted to run around a vertical axis and in a spiral direction coinciding with the pitch of the floor, and from which the spectators may view the scenery and objects aforesaid, and combined, substantially as specified.

3. A cyclorama consisting of a floor constructed around a vertical axis in the form of a spiral with a wall around its outer edge, and upon which panoramic and cycloramic scenes and objects may be arranged, and a spectators' car adapted to run upon a track on said floor and from which the spectators can view the scenery and objects, and all combined, substantially as specified.

4. In a cyclorama, the combination of a vertical spiral floor with a wall around its outer edge, and upon which panoramic or cycloramic scenes and objects are arranged, a spectators' car provided with means for its movement upon said floor and adapted to give the spectators a view of the scenes and objects while the car is in motion, substantially as specified.

5. In a cyclorama, the combination of a spiral floor having scenery thereon, a car adapted to move upon said floor and give spectators a continuous view of the scenery while upon the car and during its motion upon said floor, substantially as specified.

6. In a cyclorama, the combination of a vertical spiral floor, a central vertical axis and a spectators' car, adapted to move around and up and down the axis, and in a spiral direction coinciding with the spiral pitch of the floor, substantially as specified.

7. A cyclorama constructed in the shape of a globe with a rotative exterior surface representing the earth, substantially as specified.

8. A cyclorama constructed in the shape of a globe representing the earth, and provided with means for giving a portion of its outer surface an axial rotary movement, substantially as specified.

9. A cyclorama constructed in the shape of a globe representing the earth, and provided with scenery in its interior and having means for entering and leaving the same, consisting of the elevator mechanism, I, and the bridge, K substantially as specified.

10. A globe-shaped cyclorama mounted upon a vertical axis and provided with means for connecting its upper extremity externally with the ground and thereby maintaining it in a stable vertical position, substantially as specified.

11. A globe-shaped cyclorama mounted upon a vertical axis, the upper end of which is maintained in a stable position from the ground by means of the braces, Q, Q, Q, and combined, substantially as specified.

12. A globe-shaped cyclorama mounted upon a vertical axis, and provided with the double means of access to and from its interior, consisting of the opening, L, and stairs, M, leading therefrom, and the opening, K', bridge, K, and elevator mechanism, I, substantially as specified.

13. In a globe-shaped cyclorama, representing the earth upon its exterior surface, the combination of a vertical spiral floor, a central vertical axis and a spectators' car, adapted to move around and up and down the axis, and in a spiral direction coinciding with the spiral pitch of the floor, and the structure being provided with the double means of access to and from its interior, consisting of the opening, L, the stairs, M, leading therefrom, and the opening, K', bridge, K, and elevator mechanism, I, and all arranged, substantially as specified.

Signed at New York, in the county of New York and State of New York, this 2d day of January, A. D. 1904.

LOUIE H. MARTIN.

Witnesses:
J. T. IRVINE,
E. W. MARTIN.